United States Patent [19]

Ozaki et al.

[11] Patent Number: 5,177,615
[45] Date of Patent: Jan. 5, 1993

[54] APPARATUS FOR RECOVERING A FILM SIGNAL FROM A TELEVISION VIDEO SIGNAL

[75] Inventors: Yoshio Ozaki; Tomio Omata, both of Tokyo, Japan

[73] Assignee: Sony Corporation, Tokyo, Japan

[21] Appl. No.: 645,647

[22] Filed: Jan. 25, 1991

[30] Foreign Application Priority Data

Jan. 31, 1990 [JP] Japan .................................. 020920

[51] Int. Cl.⁵ .......................................... H04N 5/253
[52] U.S. Cl. .................................. 358/214; 358/215; 358/97
[58] Field of Search .................. 358/214, 215, 53, 54, 358/11, 140, 97

[56] References Cited

U.S. PATENT DOCUMENTS

| 3,814,850 | 6/1974 | Mitchell | 358/215 |
|---|---|---|---|
| 4,149,191 | 4/1979 | Longchamp | 358/214 |
| 4,496,990 | 1/1985 | Dyfverman | 358/310 |
| 4,876,596 | 10/1989 | Faroudja | 358/140 |
| 4,972,274 | 11/1990 | Becker et al. | 360/14.1 |
| 4,982,280 | 1/1991 | Lyon et al. | 358/105 |
| 4,998,287 | 3/1991 | Katznelson et al. | 382/34 |

FOREIGN PATENT DOCUMENTS 5775072 5/1982 Japan .
63214082 9/1988 Japan .

Primary Examiner—Michael T. Razavi
Assistant Examiner—Tuan V. Ho
Attorney, Agent, or Firm—Alvin Sinderbrand; William S. Frommer

[57] ABSTRACT

A film image recorded on an initial movie film is converted into a television video signal which is thereafter converted into another film image and recorded an another movie film. The initial movie film includes an identification film part formed in the front end part of the initial movie film and includes first and second identifying patterns which are respectively arranged in alternating frames. By adjusting the timing of the conversion of the television video signal to the other film image in accordance with the image from the identification film part obtained during this conversion, the film image recorded on the other movie film is made to correspond to the film image recorded on the initial movie film.

3 Claims, 3 Drawing Sheets

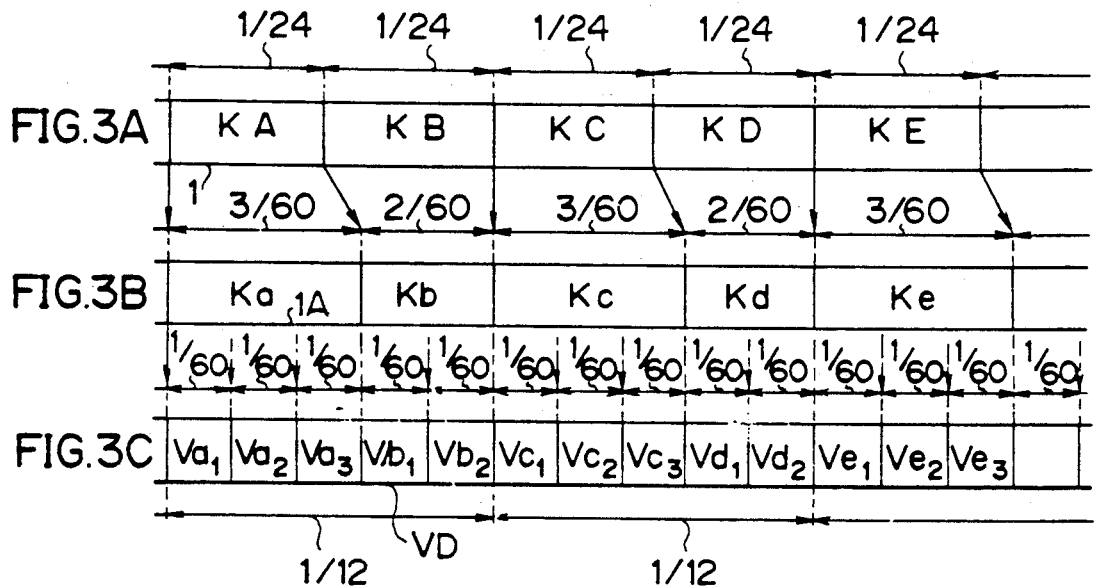
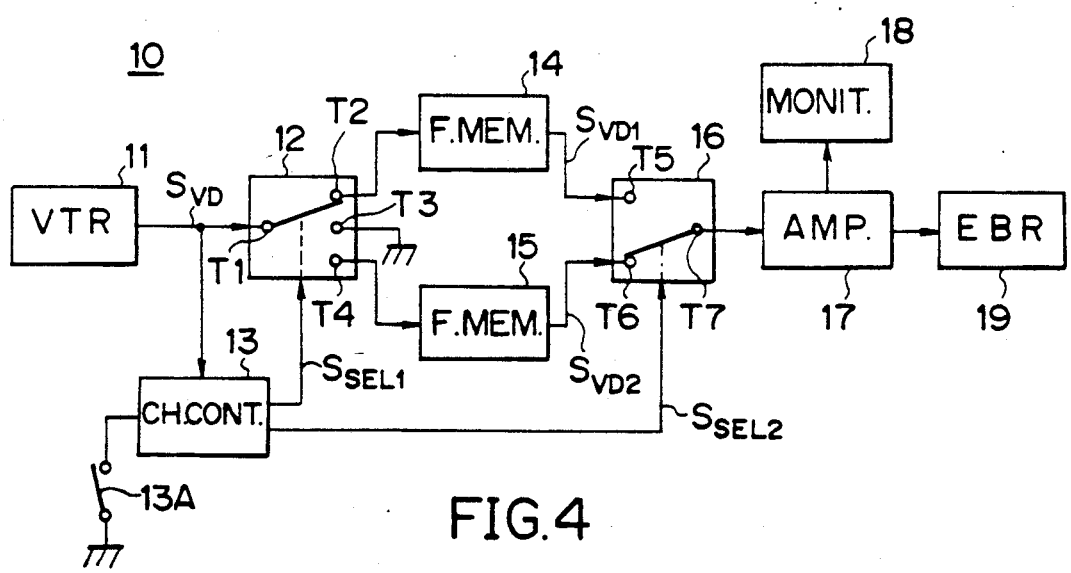
FIG.4

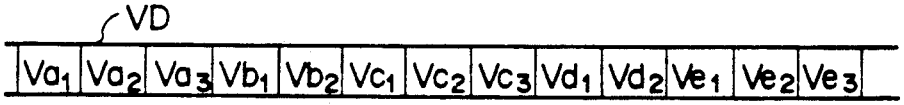

APPARATUS FOR RECOVERING A FILM SIGNAL FROM A TELEVISION VIDEO SIGNAL

BACKGROUND OF THE INVENTION

1. Field of the Invention

This invention relates to a television video signal converting apparatus and, more particularly, to such an apparatus which obtains television video signals from a movie film by means of video signal processing.

2. Description of the Prior Art

Typically, movie film is fed at a rate of twenty-four (24) frames per second. As a result, a frame rate conversion is normally required when images recorded on movie film are converted into television video signals of a standard format, for example, an NTSC television signal format. More specifically, in so-called "tele-cine" work in which the images of a movie film are converted into an NTSC television video signal having 30 frames per second (60 fields per second), frame number conversion is carried out according to a so-called "2-3 pulldown conversion system".

Thereafter, if the converted NTSC television video signal is to be recorded on movie film using, for example, an electron beam image recording system, a frame number conversion which is opposite to the previously described number conversion is carried out.

Thus, in the above situation, a frame number conversion is carried out twice. As a result, the frames of the final movie film may not correspond to those of the original movie film. Accordingly, during the reproduction or projection of the final movie film, the movement of the images from the frames may not correspond to that of the images from the frames of the original movie film and, as a result, the projected image may appear to flicker or sway. The unpleasant phenomenon is very difficult, if not impossible, to avoid completely when using this method.

However, this unpleasant phenomenon may be eliminated by using the following method. More specifically, the "tele-cine" work is carried out with the movie film being fed at a rate of 30 frames per second. Thereafter, the movie film, upon which the television video signal is to be recorded, is fed at the same rate of 30 frames per second. Therefore, in this case, the frame number conversions can be eliminated.

However, the above described method has a disadvantage. More specifically, the television video signal obtained through use of the "tele-cine" has a movement component 1.25 times as fast as the original one. Therefore, when the television video signal obtained through "tele-cine" work and a television video signal having a movement component of normal speed are combined, the resultant composed television video signal is unavoidably unnatural in appearance. Thus, this method is unacceptable.

SUMMARY OF THE INVENTION

Accordingly, it is an object of the present invention to provide a television video signal converting apparatus which avoids the above-mentioned disadvantages of the prior art. More specifically, it is to provide a television video converting apparatus in which, in the case where images from a movie film are converted into a television video signal which is thereafter video-signal-processed so as to be recorded on a new movie film, the start of the image recording can be relatively easily determined.

According to an aspect of the present invention, an initial movie film for use with a film image-television video signal converting system in which a film image recorded on said initial movie film is converted into a television video signal using a 2-3 pulldown converting process and is thereafter converted into another film image using a reverse 2-3 pulldown process, whereupon the other film image is recorded on another movie film at a feed speed of 24 frames per second comprises; a film body portion for recording the film image thereon, and an identification film portion having alternating first and second frames, in which the first frame has a first pattern which is detectable from the television video signal, and the second frame has a second pattern which is different from said first pattern and is also detectable from the television video signal.

The foregoing objects and other features of the invention are achieved by utilizing a movie film 1 fed at a rate of twenty-four frames per second, in which the images from the movie film are converted into a television video signal which is thereafter video-signal-processed in a predetermined manner. The movie film 1, according to the invention, includes an identification film part 3 utilized for reconversion, as hereinafter described, which is formed in a predetermined portion of the front end part of the movie film and which includes alternating first and second frames $K_W$ and $K_B$ having first and second identifying patterns PW and PB, respectively.

As a result, in the previously described case in which the images from the movie film are converted into a television video signal which is thereafter video-signal-processed so as to be recorded on a movie film, the start of the image recording can be readily determined by utilizing the first and second patterns PW and PB, respectively.

The above, and other objects, features and advantages of the present invention will become more apparent from the following detailed description of preferred embodiments of the present invention when read in conjunction with the accompanying drawings in which like parts are designated by like reference numerals or characters.

BRIEF DESCRIPTION OF THE DRAWINGS

FIGS. 3A through 3C are timing charts to which reference will be made in explaining a "tele-cine" work;

FIG. 4 is a block diagram of an electron beam image recording processing device according to an embodiment of the present invention; and FIGS. 5A through 5K are timing charts to which reference will be made in explaining an electron beam image recording operation.

DETAILED DESCRIPTION OF THE INVENTION

Preferred embodiments of this invention will now be described with reference to the accompanying drawings.

Figure 1:
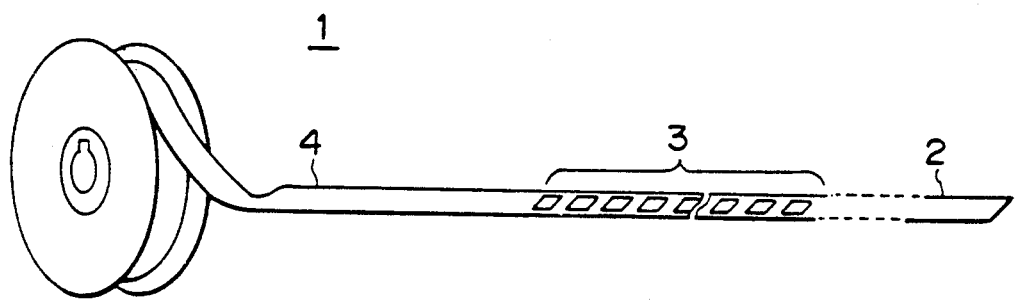
FIG. 1 illustrates a movie film according to an embodiment of the present invention.

In FIG. 1 reference numeral 1 designates a 35 mm movie film which typically has a frame feed speed of 24 frames per second. The movie film 1 includes a leader part 2, an identification film part 3 which is connected to the leader part 2, and a film body 4 connected to the identification film part 3.

Figure 2:
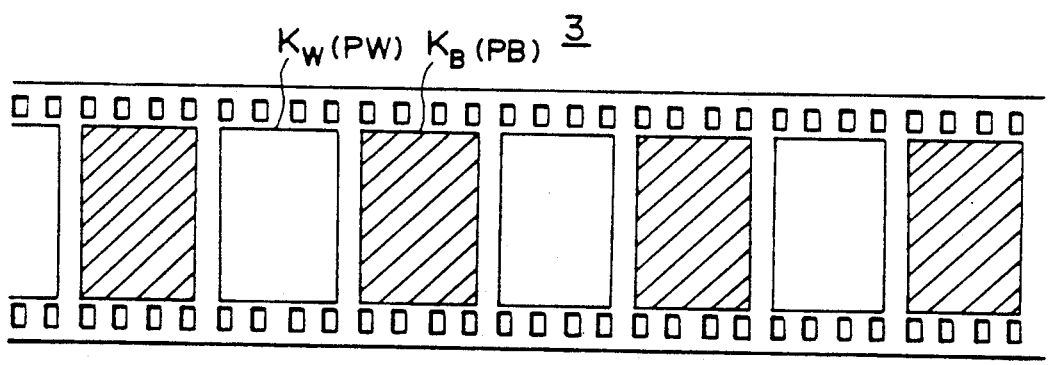
FIG. 2 illustrates an identification film part of the movie film FIG. 1.

The identification film part 3, as shown in FIG. 2, includes a series of frames, for example, thirty-two frames, in which a white frame $K_W$ having a solid white pattern and a black frame $K_B$ having a solid black pattern appear alternately. The identification film part 3 may be formed as follows. A white sheet and a black sheet are alternately photographed on thirty-two frames of a movie film, after which the film is developed. Thereafter, the identification film part 3 is bonded to the leader part 2 and the front end of the film body 4 of FIG. 1 which, in turn, has been exposed and developed.

Actual "tele-cine" work using the movie film 1 is carried out according to the 2-3 pulldown conversion method previously described.

The movie film 1, whose frame feed speed is 24 frames per second, is handled by a film feed mechanism adapted to feed a movie film at non-uniform speed, as shown in FIGS. 3A through 3C. More specifically, as shown in FIG. 3B, a frame is held for a period of time corresponding to three fields (i.e., 3/60 of a second), whereupon an image pickup tube (not shown) outputs a television video signal VD for three (3) fields, as shown in FIG. 3C. The next frame is held for a period of time corresponding to two (2) fields, while the image pickup tube outputs a television video signal VD for two (2) fields, as shown in FIG. 3C. Similar processing is performed for the remaining frames of the movie film 1. Further, the pictures whose frame rate is the frames of the movie film 1 of 24 frames per second are designated by KA, KB, KC, KD, KE, . . . , respectively, as shown in FIG. 3A.

The pictures of the frames of the movie film 1, which are alternately held for a period of time corresponding to three fields and two fields and forwarded at non-uniform speed as described above, are designated by reference characters Ka, Kb, Kc, Kd, Ke, . . . , respectively, as shown in FIG. 3B. Furthermore, the pictures of the fields of the television video signal VD outputted by the image pickup tube are designated by $Va_1$, $Va_2$, $Va_3$, $Vb_1$, $Vb_2$, $Vc_1$, $Vc_2$, $Vc_3$, $Vd_1$, $Vd_2$, $Ve_1$, $Ve_2$, $Ve_3$, . . . , respectively, as shown in FIG. 3C.

The above-described operation of converting two frames of a movie film 1 into television video signals VD having three and two fields is repeatedly carried out; that is, the "tele-cine" work is carried out according to the 2-3 pulldown conversion method, and the resultant television video signals VD are recorded on a HDVS video tape recorder (VTR).

The resultant television video signals VD together with other television video signals can be processed for image composition by using the video signal processing method. In this case, the image composition processing operation can be achieved more readily than by using the conventional optical processing method. In addition, through the use of a digital effector (not shown), it is possible to perform special effect processing which cannot be performed by the conventional optical method.

In the above-described embodiment, the identification film part 3 and the film body 4 following the leader part 2 are supplied to a tele-cine. As a result, in the beginning part of the video tape image recorded by the VTR, the white video signal (or black video signal) and the black video signal (or white video signal) are alternately recorded.

The television video image signal obtained from a tele-cine which may have been subjected to image composition processing and special effect processing, as previously described, may then be recorded on video film by using an electron beam image recording processing device 10 shown in FIG. 4.

The device 10 has a VTR 11 which is adapted to playback the video tape on which the television video signal VD subjected to image composition processing has been recorded. The VTR 11 outputs a reproduced video signal $S_{VD}$, which is applied to an input terminal T1 of a first select circuit 12 and to a change-over control circuit 13.

The first select circuit 12 has a first output terminal T2 which is connected to a frame memory 14, a second output terminal T3 which is grounded, and a third output terminal T4 which is connected to a second frame memory 15.

The first through third output terminals T2 through T4, respectively, of the first select circuit 12 are separately selected according to change-over control signals provided by the change-over control circuit 13. More specifically, when the first output terminal T2 is selected, the reproduced video signal $S_{VD}$ applied to the input terminal T1 is applied to the first frame memory 14, whereupon the signal $S_{VD}$ may be delayed for a period of time corresponding to one frame and is converted to a reproduced video signal $S_{VD1}$. The video signal $S_{VD1}$ from memory 14 is applied to a first input terminal T5 of a second select circuit 16. Similarly, when the third output terminal T4 of the fist select circuit 12 is selected, the reproduced video signal $S_{VD}$ applied to the input terminal T1 is applied to the second frame memory 15, whereupon the signal $S_{VD}$ may be delayed for a period of time corresponding to one frame and is converted to a reproduced video signal $S_{VD2}$. The video signal $S_{VD2}$ from memory 15 is applied to a second input terminal T6 of the second select circuit 16.

The change-over control circuit 13 detects a vertical synchronizing signal contained in the reproduced video signal $S_{VD}$ applied thereto and forms a "field" pulse every 1/60 of a second corresponding to the period of one field and having a five pulse or five field cycle as hereinafter described so as to form a change-over control signal $S_{SEL1}$. The change-over control signal $S_{SEL1}$ is supplied to the first select circuit 12. As a result, from the time in which a reset switch 13A is activated, the first output terminal T2 is selected for a period of time corresponding to two (2) fields, the second output terminal T3 is selected for the following period of time corresponding to one (1) field, and the third output terminal T4 is selected for the following period of time corresponding to two (2) fields.

In addition, the change-over control circuit 13 forms a "film" pulse every 1/24 of a second according to the field pulse. These film pulses form a change-over control signal $S_{SEL2}$ which is supplied to the second select circuit 16.

The reproduced video signal $S_{VD}$ provided at the output terminal T7 of the second select circuit 16 is supplied through an amplifier circuit 17 to a monitor device 18 comprising a cathode ray tube and to a so-called "electron beam image recording unit (EBR)". Thus, a television video signal VD which has been processed for image composition and recorded on video tape can be recorded on movie film.

When a television video signal VD which is subjected to "tele-cine" work is recorded on movie film again with the electron beam image recording processing device 10, five different results are obtained from the frame number reverse conversion process performed depending on when the change-over control circuit 13 is reset in response to the operation of the reset switch 13A as, for example, shown in FIGS. 5B, 5D, 5F, 5H and 5J.

That is, in FIG. 5B, the change-over control circuit 13 is reset at time RSI, thus corresponding with the top field of the images $Va_1$, $Va_2$ and $Va_3$ of the television video signal VD Which, in turn, correspond to the first frame image KA of the movie film.

As a result, the two fields having images $Va_1$ and $Va_2$ of the television video signal VD are written in the first frame memory 14, the next field having image $Va_3$ of the television video signal is dropped and the following two fields having images $Vb_1$ and $Vb_2$ of the television video signal are written in the second frame memory 15. Thereafter, the above-described operation is repeatedly performed every five fields for the television video signal VD.

As a result, the images $Va_1$, $Va_2$, $Vb_1$, $Vb_2$, . . . of the television video signal VD are applied to the EBR 19, in the manner previously described. Thus, in this situation, the frame number reverse conversion process is carried out correctly. That is, the new images $KA_1$, $KB_1$, $KC_1$, $KD_1$, $KE_1$, . . . shown in FIG. 5C, which are obtained through image composition and special effect processing, correspond to the images KA, KB, KC, KD, KE, . . . of the original movie film. These new images $KA_1$, $KB_1$, $KC_1$, $KD_1$, $KE_1$ . . . are recorded on a new movie film.

In FIG. 5D, the change-over control circuit 13 is reset at time RS2, which corresponds to the second field of the images $Va_1$, $Va_2$ and $Va_3$ of the television video signal VD which, as previously described, correspond to the first frame image KA of the movie film.

As a result, the two fields having images $Va_2$ and $Va_3$ of the television video signal VD are written in the first frame memory 14, the next field having image $Vb_1$ of the television video signal is dropped and the following two fields having images $Vb_2$ and $Vc_1$ of the television video signal are written in the second frame memory 15. Thereafter, the above-described operation is repeatedly performed every five fields of the television video signal VD.

As a result, the images of $Va_2$, $Va_3$, $Vb_2$, $Vc_1$, . . . of the television video signal VD are applied to the EBR 19, in the manner previously described. However, in this situation, the frame number reverse conversion process is not correctly carried out. That is, the new images which are to be recorded on a new movie film are images $KA_1$, KX, $KC_1$, KX, $KE_1$, . . . as shown in FIG. 5E.

Although the images $KA_1$, $KC_1$, $KE_1$, . . . correspond to the images KA, KC, KE, . . . of the original movie film 1, the images KX, on the other hand, do not directly correspond to any of the images of the original movie film, but instead are unnatural compositions of adjacent images $Vb_2$, and $Vc_1$, $Vd_2$ and $Ve_1$, . . . of the television video signal VD.

In FIG. 5F, the change-over control circuit 13 is reset at time RS3, which corresponds to the third field of the images $Va_1$, $Va_2$ and $Va_3$ of the television video signal VD which, as previously described, correspond to the first frame image KA of the movie film 1.

As a result, the two fields having images $VA_3$ and $Vb_1$ of the television video signal VD are written in the first frame memory 14, the next field having image $Vb_2$ of the television video signal is dropped and the following two fields having images $Vc_1$ and $Vc_2$ of the television video signal are written in the second frame memory 15. Thereafter, the above-described operation is repeatedly performed every five fields of the television video signal VD.

As a result, the images $Va_3$, $Vb_1$, $Vc_1$, $Vc_2$, . . . of the television video signal VD are applied to the EBR 19, in the previously described manner. However, as is to be appreciated, the frame number reverse conversion process is not correctly carried out. That is, the new images which are to be recorded on a new movie film are images KX, $KC_1$, KX, $KE_1$, . . as shown in FIG. 5G. As previously described, images KX do not directly correspond to any of the images of the original movie film.

In FIG. 5H, the change-over control circuit 13 is reset at time RS4, which corresponds to the top field of the images $Vb_1$ and $Vb_2$ of the television video signal VD which correspond to the image KB of the movie film 1.

As a result, the two fields having images $Vb_1$ and $Vb_2$ of the television video signal VD are written in the first frame memory 14, the next field having image $Vc_1$ of the television video signal is dropped and the following two fields having images $Vc_2$ and $Vc_3$ of the television video signal are written in the second frame memory 15. Thereafter, the above-described operation repeatedly is performed every five fields of the television video signal VD.

As a result, the images $Vb_1$, $Vb_2$, $Vc_2$, $Vc_3$, . . . of the television video signal VD are applied to the EBR 19, in the previously described manner, whereby the frame number reverse conversion process is correctly carried out. That is, the new images $KB_1$, $KC_1$, $KD_1$, $KE_1$ . . . shown in FIG. 5I, which are obtained through image composition and special effect processing, correspond to the images KB, KC, KD, KE, . . . of the original movie film and are recorded on a new movie film.

In FIG. 5J, the change-over control circuit 13 is reset at time RS5, which corresponds to the second field of the images $Vb_1$ and $Vb_2$ of the television video signal VD which correspond to the image KB of the movie film.

As a result, the two fields having images $Vb_2$ and $Vc_1$ of the television video signal VD are written in the first frame memory 14, the next field having image $Vc_2$ of the television video signal is dropped and the following two fields having images $Vc_3$ and $Vd_1$ of the television video signal are written in the second frame memory 15. Thereafter, the above-described operation is repeatedly performed every five fields of the television video signal VD.

As a result, the images $Vb_2$, $Vc_1$, $Vc_3$, $Vd_1$, . . . of the television video signal VD are applied to the EBR 19, in the previously described manner. However, as is to be appreciated, the frame number reverse conversion process is not correctly carried out. That is, the new images which are to be recorded on a new movie film are images KX as shown in FIG. 5K, which, as previously described, do not directly correspond to any of the images of the original movie film.

In the above situations in which the images KX are applied to the EBR 19, as described with reference to FIGS. 5E, 5G and 5K, a white image (or black image) and a gray image appear alternately on the monitor device 18, or only the gray image appears on the monitor devices. Hence, detection of a gray image, which is to be appreciated can be easily detected from the monitor device 18, indicates that the frame number reverse conversion is not being correctly carried out.

On the other hand, in the above situations in which the new images $KA_1$, $KB_1$, $KC_1$, $KD_1$, $KE_1$, ..., which are obtained through image composition and special effect processing and which correspond to the images KA, KB, KC, KD, KE ...of the original movie film, are applied to the EBR 19, a white image and a black image appear alternately on the monitor device 18. Hence, detection of such white and clack alternating images indicates that the frame number reverse conversion is being correctly carried out.

Accordingly, in the situations in which a white image (or black image) and a gray image appear alternately on the monitor device 18 or only the gray image appears on the monitor device, the operator of the electron beam image recording processing device 10 should operate the reset switch 13A such that the electron beam image recording operation is started (or restarted) so that a white image and a black image, without any gray images, appear alternately on the monitor device 18. In these situations, new images, which are obtained through image composition and special effect processing and which correspond to the images of the original movie film 1, are recorded on a new movie film.

As described above, in the movie film 1, the identification film part 3 having a series of thirty-two frames in which white frames $K_W$ and black frames $K_B$ are arranged alternately is connected to the leader part 2. Hence, in the situation in which the images of a movie film are converted into television video signals, and the television video signals thus obtained are subjected to video signal processing so as to record the images on a new movie film; the correspondence of the newly recorded images to those of the original movie film 1 can be relatively easily detected.

Thus, by utilizing the movie film 1 of the present invention in the above-described situation, the electron beam image recording process including the "tele-cine" work can be greatly simplified.

In the above-described embodiment, the identification film 3 includes a series of thirty-two alternately arranged white and black frames in which each white frame $K_W$ has a solid white pattern PW and each black frame $K_B$ has a solid black pattern PB. However, as is to be appreciated, the present invention is not so limited and various modifications thereto may be performed. For instance, adjacent frames in the identification film part 3 may be designed so that they are different in color, or different in geometrical pattern or the like, provided that the adjacent frames in the identification film part are designed so as to enable a determination to be readily made as to whether or not the frame number reverse conversion process is being carried out correctly. Further, the length of the identification part 3 is not limited to a series of thirty-two frames and other lengths may instead be employed with the same effects.

Furthermore, although in the above-described embodiment the identification film part 3 is connected to the film body 4 which has been exposed and developed, other methods may be employed. As an example, the identification film part 3 may be formed by using the top portion of a movie film which has not yet been exposed, and thereafter the remaining portion of the movie film may be used as the film body for photographing.

Further, although in the above-described embodiment the operator controls the starting of the electron beam image recording process by visually watching the screen of the monitor device 18, as previously described, the present invention is not so limited. For instance, by monitoring the video signals using an oscilloscope or the like, the above-described effects can be detected. Furthermore, the above-described embodiment is not limited to having the operator control the start of the electron beam image recording process by visually watching the screen of the monitor device 18 and resetting the electron beam image recording processing device 10 accordingly. As an example, the playback start field from the VTR II can be provided with a time code or the like, whereupon the playback can be set to operate in response to the start of the electron beam image recording process.

Although preferred embodiments of the present invention and various modifications have been described in detail herein, it is to be understood that this invention is not limited to the specifically described embodiments and modifications and that other modifications and variations may be effected therein by one skilled in the art without departing from the spirit and scope of the invention as defined by the appended claims.

What is claimed is:

1. In a television video signal converting apparatus having:

means for supplying a television video signal having a plurality of fields and including a vertical synchronizing signal, first selecting means for receiving said television video signal and for generating and supplying a reverse 2-3 pulldown converted image signal to first and second output terminals, first memory means connected to said first output terminal for storing a frame of said reverse 2-3 pulldown converted image signal, second memory means connected to said second output terminal for storing a frame of said reverse 2-3 pulldown converted image signal, and second selecting means connected to said first and second memory means for selectively receiving output signals from said first and second memory means, and in which said first and said second selecting means are controlled in response to said vertical synchronizing signal of said television video signal so as to obtain from said second selecting means a signal having a plurality of frames suitable for recording on film, with each of said frames for recording on said film corresponding to two related fields of said television video signal, the improvement comprising:

control means for receiving said vertical synchronizing signal for generating first and second control signals therefrom which respectively have periods of 1/60th and 1/24th of a second, means supplying said first control signal to said first selecting means so as to cyclically control the latter such that said first selecting means transmits two successive fields of said television video signal from said first output terminal, inhibits transmission of the next field of said television video signal, and then transmits the following two successive fields from said second output terminal, means supplying said second control signal to said second selecting means so as to control the latter such that said second selecting means outputs said signal having a plurality of frames suitable for recording on said film, monitor means for monitoring said signal having a plurality of frames suitable for recording on said film and which is output from said second selecting means; and resetting means for resetting said control means when said monitor means indicates that each of said frames of the signal suitable for recording on said film fails to respectively correspond to the two related fields of said television video signal.

2. An apparatus for recovering an initial movie signal comprised of adjacent frames from a video signal comprised of first and second pluralities of fields representing said adjacent frames, and alternating first and second pluralities of fields of first and second patterns, said apparatus comprising:

first memory means for storing a plurality of said fields of said video signal;

second memory means for storing a plurality of said fields of said video signal;

distributing means responsive to a control signal for distributing respective first and second pluralities of fields of said video signal to said first and second memory means;

selecting means for selectively supplying fields from said first memory means and said second memory means as a selected movie signal;

control signal generating means for providing said control signal;

resetting means for resetting said control signal when said selected movie signal contains a signal representing a third pattern formed from said first and second patterns; and supplying means for supplying said selected movie signal as a recovered initial movie signal when said selected movie signal is devoid of said third pattern.

3. A method for performing image processing on a film image recorded on an initial movie film, said initial movie film comprising a film body portion in which is recorded said film image and an identification film portion having alternating first and second frames, said first frame having a first pattern and said second frame having a second pattern which is different from said first pattern, said method comprising the steps of:

reproducing said initial movie film to obtain an initial movie signal comprising a film image signal and an identification signal;

converting said initial movie signal into a video signal comprising a video image signal and a video identification signal, in which adjacent frames of said initial movie signal are represented as adjacent first and second pluralities of fields;

performing image processing on said video image signal to obtain a processed video signal comprising said video identification signal and a processed film image signal; and reverse converting said processed video signal into a final movie signal comprising a final film image signal and a final identification signal, in which adjacent first and second pluralities of fields of said processed video signal are represented as adjacent final frames, and wherein said adjacent final frames of said final identification signal have said first and second patterns.

* * * * *